J. N. HEALD & A. M. DRAKE.
BELT TIGHTENER.
APPLICATION FILED DEC. 17, 1917.

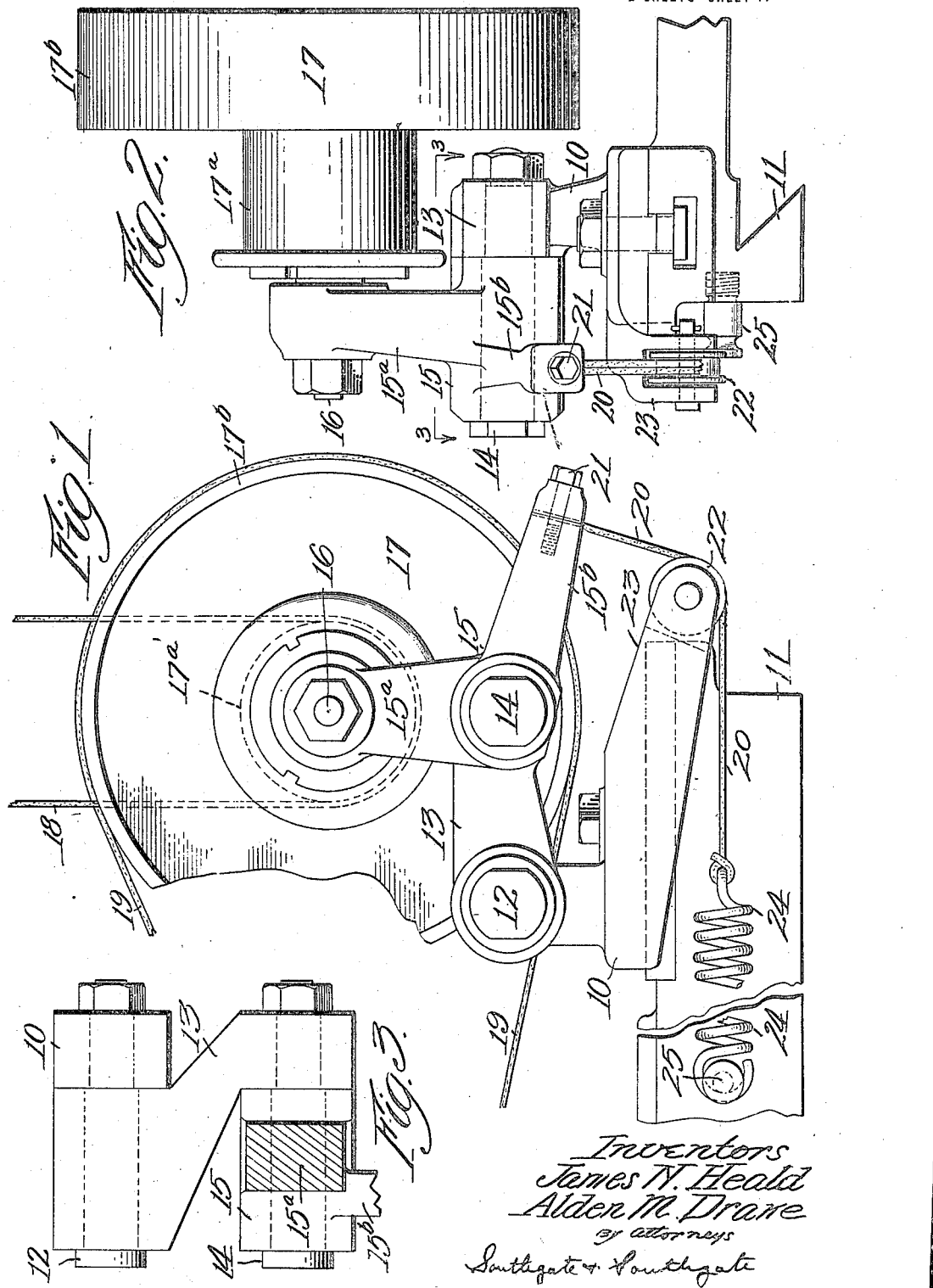

1,301,937.

Patented Apr. 29, 1919.
2 SHEETS—SHEET 2.

Inventors.
James N. Heald.
Alden M. Drake.
By Attorneys.
Southgate & Southgate

UNITED STATES PATENT OFFICE.

JAMES N. HEALD AND ALDEN M. DRAKE, OF WORCESTER, MASSACHUSETTS, ASSIGNORS TO HEALD MACHINE COMPANY, A CORPORATION OF MASSACHUSETTS.

BELT-TIGHTENER.

1,301,937.  Specification of Letters Patent.  Patented Apr. 29, 1919.

Application filed December 17, 1917. Serial No. 207,438.

*To all whom it may concern:*

Be it known that we, JAMES N. HEALD and ALDEN M. DRAKE, citizens of the United States, residing at Worcester, in the county of Worcester and State of Massachusetts, have invented a new and useful Belt-Tightener, of which the following is a specification.

This invention relates to a belt tightener of a type adapted to simultaneously tighten belts running therefrom in two different directions. This type of belt tightener is found particularly useful in internal grinders and other similar machines in which a rapidly rotating spindle is mounted upon a movable cross-slide.

It is the general object of our invention to improve the construction of such belt tightening devices, simplifying the parts thereof, and correspondingly increasing their efficiency in operation.

With this general object in view, our invention in its preferred form comprises pulleys having a bearing supported at the end of a swinging arm which is itself mounted upon a floating pivot at the end of a second swinging arm having a fixed bearing. Suitable tension devices are provided effective to simultaneously tension belts running from the pulleys at a substantial angle to each other.

Our invention further relates to certain arrangements and combinations of parts hereinafter described and more particularly pointed out in the appended claims.

Two forms of our invention are shown in the drawings, in which—

Figure 1 is a side elevation of our improved belt tightener;

Fig. 2 is a front elevation thereof, certain parts being shown in section;

Fig. 3 is a sectional plan view, taken along the line 3—3 in Fig. 2, and

Figure 4:
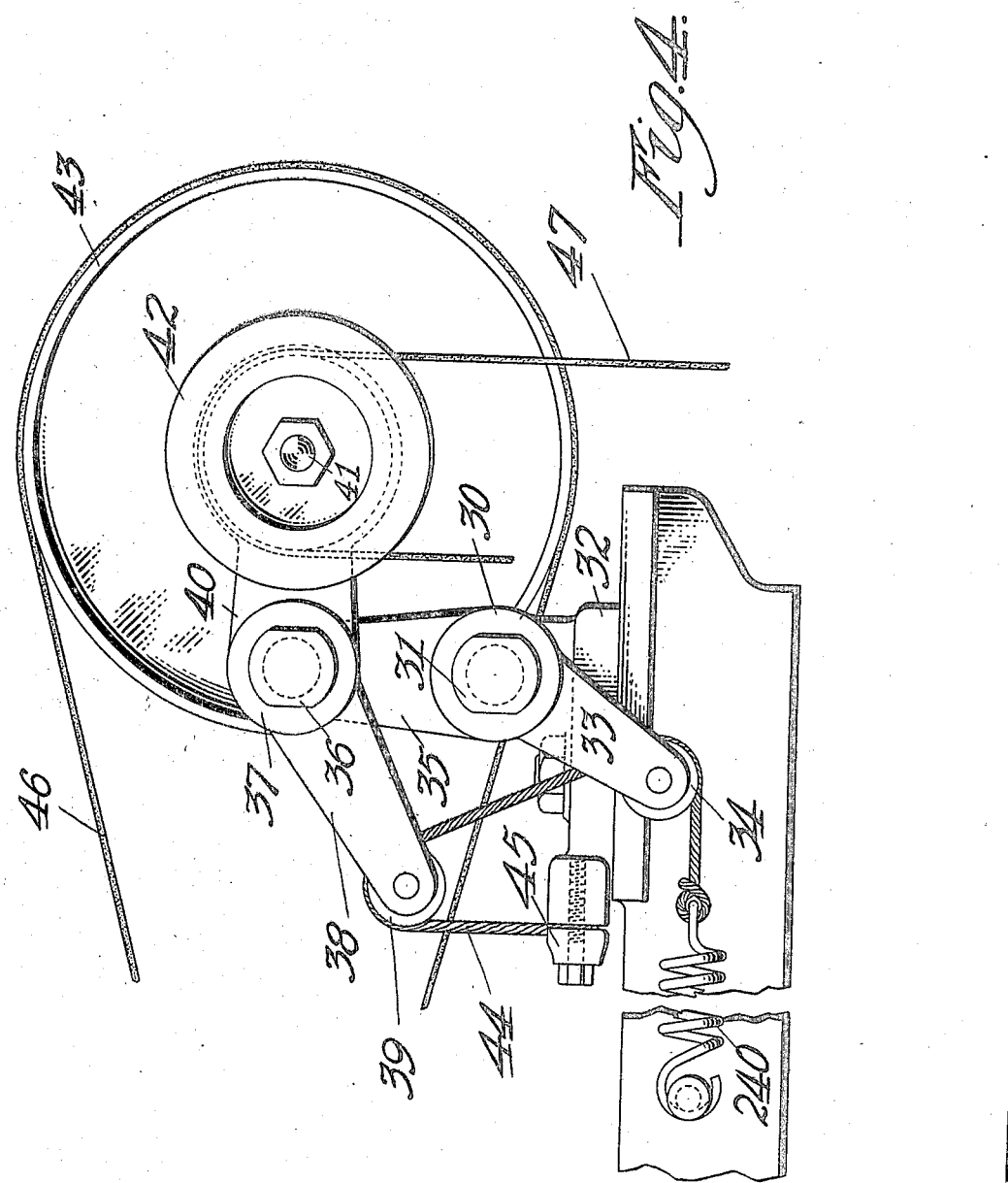
Fig. 4 is a side elevation of a modification.

Referring to Figs. 1, 2 and 3, we have shown a stand 10 secured to or forming a part of a cross-slide 11 which may be mounted to slide transversely in an internal grinder or other similar machine. A headed stud 12 is fixed in the stand 10 and constitutes a support upon which an offset supporting arm 13 (Fig. 3) is pivotally mounted. A similar stud 14 is fixed in the outer or swinging end of the arm 13 and furnishes a support for a bell crank or lever arm 15 having an upwardly extending arm $15^a$ and a laterally extending arm $15^b$.

A stud 16 is fixed in the end of the arm $15^a$ and constitutes a bearing for a double pulley 17 having a smaller portion $17^a$ and a larger portion $17^b$. A substantially vertical driving belt 18 is indicated as running upon the smaller portion $17^a$ and a belt 19 runs from the larger portion $17^b$ to the driving spindle (not shown) upon which a small grinding wheel or other rotary tool may be mounted.

Tension is applied to the arm $15^b$ of the bell crank 15, the form of tension device shown in the drawings comprising a flexible cord 20 clamped to the end of the arm $15^b$ by a binding screw 21 and extending around a guide pulley 22 mounted on an arm 23 extending laterally from the stand 10. A tension spring 24 is secured at one end to the cord 20 and at its opposite end to a stud 25 mounted in the cross-slide 11.

The tension thus applied to the arm $15^b$ acts primarily to swing the bell crank 15 about its pivot 14 and thus tighten the belt 19. As soon, however, as this is accomplished the continued tension of the spring 24 acts to swing the stud 14 downwardly about the axis of the arm 13 and stud 12, thus applying tension to the vertical driving belt 18.

Furthermore, since the stud 25 and guide roll 22 are both mounted to move laterally with the cross-slide 11, the tension upon the belts 18 and 19 will be maintained in every lateral position of the slide 11. The device responds immediately to variations in the condition of either belt, but at the same time maintains effective tension upon both belts.

By this simple combination, therefore, of a bell crank or lever arm mounted upon a swinging arm and controlled by a single tension device we secure an extremely efficient and satisfactory belt tightener for the purposes indicated.

In Fig. 4 we have shown our invention as adapted to an underneath drive. In this construction a lever 30 is pivoted on a stud 31 fixed in a stand 32 movable with or forming a part of the cross-slide of the grinder. The lever 30 comprises a depending arm 33 provided with a guide roll 34 and an upwardly projecting arm 35 supporting a stud 36 upon which is pivoted a second lever 37 having a downwardly inclined arm 38 provided with a guide roll 39, and having also a laterally projecting arm 40 supporting a bearing for a short shaft 41 to which are secured belt pulleys 42 and 43. A cord or other flexible member 44 is connected at one end by a clamp 45 to the stand 32. The cord 44 passes around the two guide pulleys 39 and 34 and is connected to a spring 240 corresponding to the spring 24 previously described. A belt 46 connects the pulley 43 to the grinding wheel spindle, and a driving belt 47 connects the pulley 42 with a driving pulley, not shown, but positioned below the plane of the cross-slide. The spring 240 acts through the flexible member 44 to tension both belts 46 and 47, as in the form first described. The tension upon the guide pulley 34 acting through the lever 30 moves the stud 36 and shaft 41 to the right and tensions the belt 46. At the same time the spring 240 acting through the guide pulley 39 on the lever 37 tends to move the shaft 41 upwardly, thus tensioning the belt 47.

Having thus described two forms of our invention, it will be evident that other changes and modifications can be made therein, particularly in the means for applying tension to the device, without departing from the spirit and scope of our invention, as set forth in the claims. Therefore we do not wish to be otherwise limited to the details herein disclosed, but what we claim is—

1. A belt tightener having, in combination, a stand, a member pivotally mounted on said stand, a lever pivotally mounted on and supported by said member, a pair of pulleys rotatably mounted on said lever and having belts leading therefrom in different directions, and a single means acting on said lever and member effective to yieldingly move said pulleys to tension both of said belts simultaneously.

2. A belt tightener having, in combination, a stand, a member pivotally mounted on said stand, a lever pivotally mounted on and supported by said member, a pair of pulleys rotatably mounted on said lever and having belts leading therefrom in different directions, and means to apply yielding tension to said lever and member to tension both of said belts simultaneously.

3. A belt tightener having, in combination, a stand, a member pivotally mounted on said stand, a lever pivotally mounted on and supported by said member, a pair of pulleys rotatably mounted on said lever and having belts leading therefrom in different directions, and a single means for applying yielding tension to said pulleys simultaneously in two directions, to thereby tension said belts.

4. A belt tightener comprising a pair of pulleys rotatable together, a bearing for said pulleys, a jointed supported for said bearing comprising two relatively movable portions, and means to apply yielding tension to said pulleys, effective to tension belts leading therefrom in two different directions.

5. A double belt tightener comprising a pair of pulleys rotatable together, a lever on which said pulleys are mounted, a floating bearing for said lever, and means to apply tension to said lever.

6. A belt tightener having, in combination, a stand, a movable support pivoted to said stand, a lever pivotally mounted on and supported by said support, a pair of pulleys rotatable together and mounted at one end of said lever, and a spring connected to apply tension to the opposite end of said lever and through said lever to said support.

7. A belt tightener having, in combination, a stand, a movable support pivoted to said stand, a lever pivotally mounted on and supported by said support, pulleys rotatably mounted on said lever having belts running therefrom substantially at right angles to each other, and means to apply yielding tension to said lever and support effective to simultaneously tighten both of said belts.

8. A belt tightener having, in combination, a stand, a lever pivotally mounted on said stand, a second lever mounted on said first lever, a pair of pulleys rotatably mounted on said second lever and having belts leading therefrom in different directions, a guide pulley on each lever, a spring, and a flexible member passing around said guide pulleys and connected at its opposite ends to said stand and said spring, said spring being effective through said levers to tension said belts.

9. A belt tightener having, in combination, a stand, an arm pivoted to said stand, a second arm pivoted to said first arm, pulleys rotatably mounted on said second arm having belts running therefrom substantially at right angles to each other, and a spring effective to swing said second arm outward and said first arm downward simultaneously and to thereby tension the belts carried thereby.

10. A belt tightener having, in combination, a stand, a supporting arm pivoted to said stand, a bell crank pivoted to said supporting arm, a pair of pulleys secured together and rotatably mounted on one arm of said bell crank, a flexible member connected to the second arm of said bell crank, a guide pulley on said stand for said flexible member, and a spring secured at one end to said stand and at the other end to said member.

In testimony whereof we have hereunto affixed our signatures.

JAMES N. HEALD.
ALDEN M. DRAKE.